United States Patent [19]
Kuwabara et al.

[11] Patent Number: 4,500,998
[45] Date of Patent: Feb. 19, 1985

[54] GAS LASER

[75] Inventors: Kouji Kuwabara; Hiroyuki Sugawara, both of Hitachi; Toshiharu Shirakura, Tohkai; Yukio Kawakubo; Kouji Sasaki, both of Hitachi, all of Japan

[73] Assignee: Hitachi, Ltd., Tokyo, Japan

[21] Appl. No.: 410,955

[22] Filed: Aug. 24, 1982

[30] Foreign Application Priority Data

Sep. 9, 1981 [JP] Japan ................................ 56-141022

[51] Int. Cl.³ .............................................. H01S 3/03
[52] U.S. Cl. ..................................... 372/61; 372/700; 372/93; 372/58; 372/34; 372/55
[58] Field of Search ........................... 372/700, 92–94, 372/61, 58, 59, 55, 34, 97, 69

[56] References Cited

U.S. PATENT DOCUMENTS 4,242,646 12/1980 Macken .................................. 372/61
4,242,647 12/1980 Macken .................................. 372/34

Primary Examiner—William L. Sikes
Assistant Examiner—Léon Scott, Jr.
Attorney, Agent, or Firm—Antonelli, Terry & Wands

[57] ABSTRACT

The invention is to provide a gas laser in which a discharge tube of a double-tube construction comprising a inner tube and an outer tube of a relatively large diameter is employed, a tubular discharge space filled with a gas mixture is formed between the inner tube and the outer tube, a gas mixture cooling passage is formed within the discharge space, and a pair of mirror groups are disposed at both ends of the discharge space, each mirror group comprising a plurality of mirrors arranged in the circumferential direction. The respective mirrors are arranged in such a manner that a laser beam is reflected by the mirrors to go and return in the discharge space several times and each path of the laser beam between the corresponding two mirrors obliquely intersects the central axis of the discharge space. Thus, it is possible to obtain a laser beam in single mode with a single discharge tube without the need of enlarging a length of the tube and also to reduce a pressure loss of the gas mixture within the discharge space.

10 Claims, 6 Drawing Figures

GAS LASER

BACKGROUND OF THE INVENTION

1. Field of the Invention

This invention relates to a gas laser having an improved discharge tube.

2. Description of the Prior Art

In general, gas laser include a pair of electrodes, for example a cathode and an anode, within a discharge tube. When a DC power supply connected between the cathode and the anode is energized, there occurs glow discharge between both electrodes and a gas mixture such as carbon dioxide ($CO_2$), nitrogen gas ($N_2$) or helium (He) filled in the discharge tube is excited with energy of the glow discharge to the population invertion state, so that a laser beam is generated. The laser beam is reflected by a reflecting mirror and an output mirror which are disposed at both ends of the discharge tube, respectively, so as to go and return therebetween. A part of the thus amplified laser beam is output to the outside through the output mirror.

It is already known that laser output per unit length of the discharge tube can be increased by cooling the gas mixture which has been warmed up during glow discharge. A typical cooling means comprises a cooling passage in communication with the discharge tube, and a heat exchanger and a blower are disposed in the cooling passage. The gas mixture is forcedly fed into the cooling passage from the discharge tube, cooled with the heat exchanger and then, circulated to pass through the discharge tube once again. On this occassion, a speed of the running gas mixture reaches above 10 m per second.

On the other hand, when focusing the led out laser beam by means of a lens or the like, the maximum energy density is observed on is focal plane in the so-called single mode where distribution of the intensity of the laser beam assumes the gauss distribution. In the case the laser beam in single mode is used to machine workpieces, particularly used for froming grooves or openings in steel plates, it is possible to render the groove with a narrower width and the openings with a smaller diameter, so that such laser beam can perform precise machining. In order to generate a laser beam in single mode, there is usually adopted such a means as reducing an inner diameter of the discharge tube or increasing a distance between the mirrors at both ends of the tube. In addition, there is also adopted such a method for generating a laser beam in single mode and with higher output that a number of discharge tubes of a small diameter are employed and these discharge tubes are optically coupled to each other using a number of mirrors.

However, the above described increase in a total length by the use of plural discharge tubes or reduction in an inner diameter of the discharge tube is inevitably accompanied with the fact that the resistance exerted on the gas mixture when passing through the discharge tube, that is, a pressure loss within the discharge tube is increased correspondingly. Therefore, such a blower was required for the conventional gas laser which can produce a large pressure enough to overcome the increased pressure loss.

Also, the increase in a total length by the use of plural discharge tubes connected to each other requires a larger space for installation thereof. With a view to avoid enlargement in a length of the discharge tube, Japanese Patent Open to the Public No. 49-64392 proposes a gas laser in which cooling cylinders 31 to 34 and discharge cylinders 21 to 24 are disposed within a hollow tube 1. But the gas laser shown in FIG. 2 has such a construction that a plurality of laser beams are led out and these beams are focused on a point, thus inevitably leading to a difficulty in focusing and more complicated structure.

SUMMARY OF THE INVENTION

A first object of the invention is to reduce a pressure loss within the discharge tube and to provide a gas laser of smaller size.

A second object of the invention is to provide a gas laser with the improved conversion efficiency from a gas mixture into a laser beam.

To achieve the first object, the gas laser according to this invention is so constructed that a discharge tube of a double-tube construction with a relatively large diameter is employed, a tubular discharge space filled with a gas mixture is formed between inner and outer tubes, a pair of mirror groups are disposed at both ends of the discharge tube, each mirror group comprises a plurality of mirrors disposed at the end of the tubular discharge space in the circumferential direction, and the respective mirrors are arranged in such a manner that a laser beam is reflected by the mirrors to repeatedly go and return in the discharge space and each path of the laser beam between the corresponding two mirrors obliquely intersects the central axis of the discharge tube. This construction makes it possible to provide the miniaturized discharge tube in which the laser beam is substantially narrowed and lengthened with a single discharge tube, and also to reduce a pressure loss of the gas mixture when passing through the discharge tube.

DETAIL DESCRIPTION OF THE PREFERRED EMBODIMENTS

Figure 1:
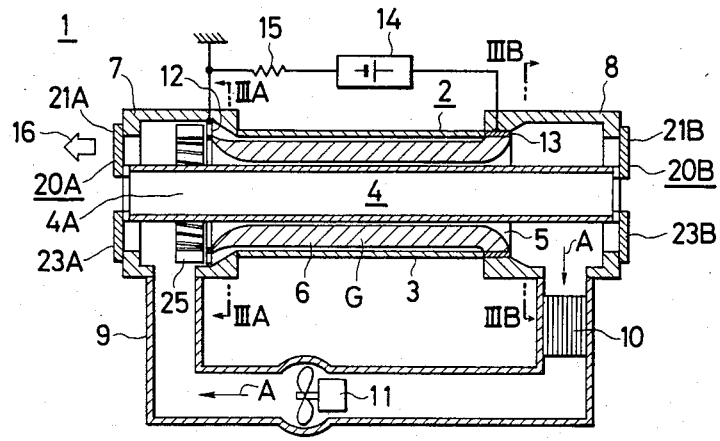
FIG. 1 is a side sectional view of a gas laser embodying this invention.

Referring to FIG. 1, a discharge tube 2 of a gas laser 1 has a doubletube construction comprising a hollow discharge tube 3 in which there occurs discharge, and a cooling tube 4 disposed within the hollow discharge tube 3. Through the interior 4A of the cooling tube 4, a coolant (not shown) such as cooling water passes from an inlet at the left end to an outlet at the right end thereof. A discharge space 5 is formed between the hollow discharge tube 3 and the cooling tube 4. The discharge space 5 is filled with a gas mixture 6 such as $CO_2$, $N_2$ or He. Upstream and down-stream containers 7, 8 are mounted at both ends of the hollow discharge tube 3 so as to surround the projected end portions of the cooling tube 4. In place of these containers, the hollow discharge tube may be extended to form the similar chambers. A cooling passage 9 connected to the containers 7, 8 includes a heat exchanger 10 and a blower 11 therein. Therefore, with the blower 11 being operated, the gas mixture 6 is circulated in the direction indicated by an arrow A to pass through the discharge space 5.

Figure 2:
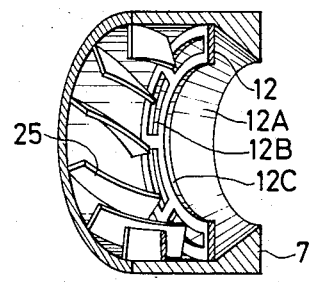
FIG. 2 is a perspective view of the surrounding of a cathode shown in FIG. 1.
Figure 3A:
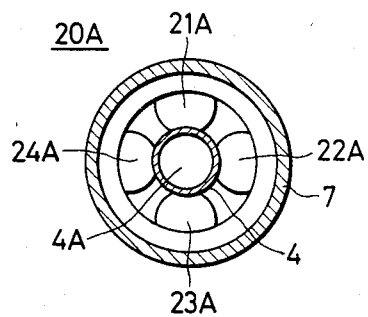
FIGS. 3A and 3B are sectional views taken along the line IIIA—IIIA and the line IIIB—IIIB in FIG. 1, respectively.
Figure 3B:
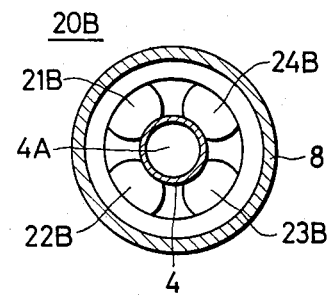

A pair of electrodes, for example a cathode 12 and an anode 13, are attached at both ends of the hollow discharge tube 3 with the discharge space 5 therebetween. As shown in FIG. 2, the cathode 12 is formed of a ring which has a through hole 12A with a diameter greater than that of the cooling tube 4, while a plurality of gas introducing ports 12B are formed in the ring outside of the through hole 12A in the circumferential direction. An inner surface of the ring facing the through hole 12A constitutes a discharge surface 12C. Thus, the gas mixture 6 having passed through the gas introducing ports 12B has a function to hollow glow discharge G leading from the discharge surface 12C. The anode 13 is disposed at the other end of the hollow discharge tube 3 and its inner surface constitutes a discharge surface. Between the cathode 12 and the anode 13 there are connected a DC power supply 14 and a ballast resistor 15. When the DC power supply 14 is energized to apply DC voltage between the cathode 12 and the anode 13, there occurs the glow discharge G within the discharge space 5 and the gas mixture 6 is excited to the population inversion state, so that a laser beam 16 is generated. The laser beam 16 goes and returns between a pair of mirror groups 20A, 20B which are attached to the containers 7, 8, respectively, and then it is output from an output mirror 21A to the outside.

Constructions of the pair of mirror groups 20A, 20B will be now described by referring to FIGS. 3A to 5. Four mirrors 21A, 22A, 23A and 24A are disposed at the end face of the upstream container 7 confronting to the end face of the downstream container 8. One of these mirrors serves as an output mirror 21A which is formed of ZnSe materials. The remaining mirrors serve as reflecting mirrors 22A, 23A and 24A, and are of plane mirrors. These four mirrors are located in the circumferential direction with an equal interval of angular distance therebetween. Corresponding to the mirrors mounted to the upstream container 7, four mirrors 21B, 22B, 23B and 24B are disposed at the end face of the downstream container 8. One of these mirrors is of a concave mirror 24B and the remaining mirrors are of plane mirrors 21B, 22B and 23B, all of which are located in the circumferential direction with an equal interval of angular distance therebetween in a similar manner. The pair of right and left mirror groups 20A, 20B are positioned so that there occurs a phase difference of 45 degrees between the corresponding right and left mirrors locating on planes including the parallel end faces of the containers.

Figure 4:
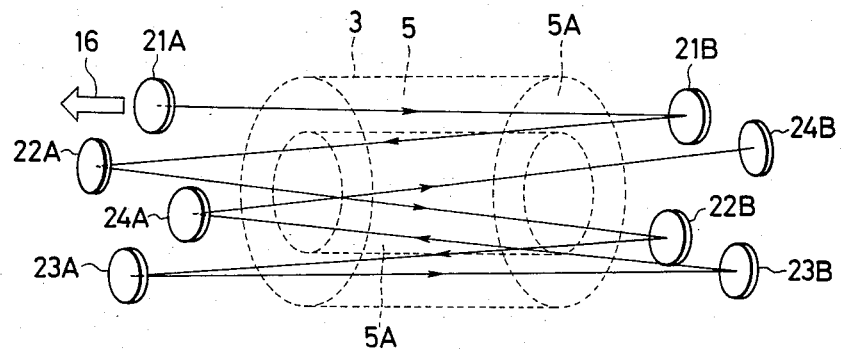
FIG. 4 is an explanatory view showing reflection paths of a laser beam.

Accordingly, the laser beam 16 excited with discharge is reflected by the respective mirrors in such a manner that its optional axis obliquely intersects the central axis of the hollow discharge tube 3, as illustrated in FIG. 4. More specifically, the laser beam 16 runs from the output mirror 21A to the plane mirror 21B adjacent to the concave mirror 24B, is reflected by the plane mirror 21B and then, runs from the plane mirror 22A to the plane mirror 22B. In this way, the laser beam 16 is repeatedly reflected between the mirrors while turning in a counterclockwise direction as viewed from the output mirror 21A within the discharge space until it reaches the concave mirror 24B after hitting upon and being reflected by the remaining plane mirrors 23A, 23B and 24A in due order. The laser beam having reached the concave mirror 24B is now reflected to go back passing through the similar optical path in the reversed direction until the output mirror 21A while turning in a clockwise direction. In such a manner, the excited laser beam 16 is reflected by the mirrors to repeatedly go and return within the tubular discharge space 5 while turning in the circumferential direction so as to be amplified, and then a part of the laser beam is led our from the output mirror 21A.

Figure 5:
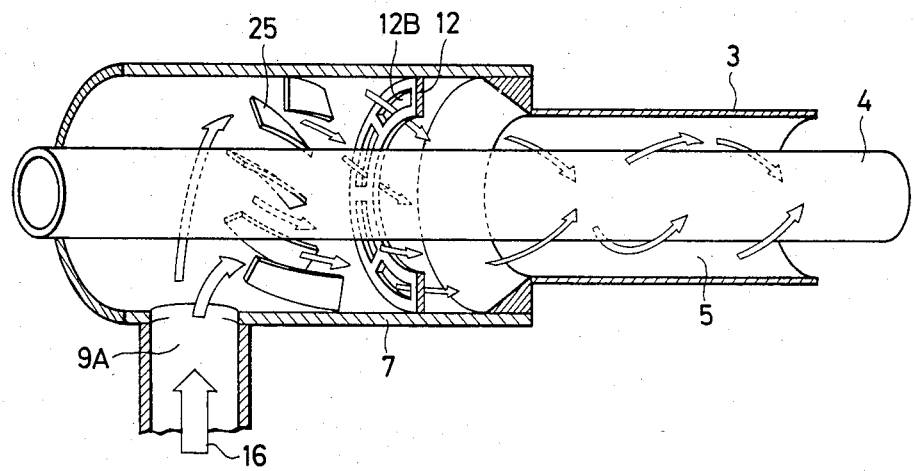
FIG. 5 is a perspective view showing an essential part of the gas laser shown in FIG. 1.

As shown in FIG. 5, a plurality of fins 25 are attached to the container 7 in a position between an inlet 9A of the cooling passage and the cathode 12, and these fins function to cause the gas mixture 5 to be spirally turned within the discharge space. As an alternative, the fins may be disposed on the downstream side of the cathode, that is, on the side corresponding to the anode.

The above described gas laser 1 is briefly so constructed that the tubular discharge space 5 is formed between the hollow discharge tube 3 and the cooling tube 4, the plural mirror groups 20 disposed at both ends of the discharge space 5 have its optical axis obliquely intersecting the central axis of the discharge space, and the respective mirrors are arranged in such a manner as permitting the laser beam to repeatedly go and return between the mirror groups while turning in the circumferential direction. Therefore, according to the gas laser 1 of this invention, it is possible to obtain the laser beam 16 in substantially single mode without the need of enlarging a length of the discharge tube. In addition, the discharge space 5 serving as a circulating path for the gas mixture 6 has a sectional area enough to accommodate the plural mirror groups 20 therein, so that the gas mixture can pass through the discharge space with an extremely small pressure loss even when it is run at a higher speed. As a result, a pressure required for the blower 11 becomes smaller.

Furthermore, the present gas laser has a simple construction, because the discharge space includes therein one or more pairs of cathode 12 and anode 13 only. This makes it possible to facilitate assembling and adjusting operations.

This invention will be now compared with the prior art to clarify how the gas laser of this invention is reduced in its size and pressure in the foregoing embodiment when generating a laser beam of 1 kW.

(1) Based on an approximate calculation, the gas laser according to this invention can produce laser output of 1 kW in a single mode on the conditions that the hollow discharge tube 3 constituting an outer tube for the discharge tube 2 has an inner diameter of 118 mm, the cooling tube 4 has an outer diameter of 58 mm, the discharge tube 2 has a length of 1 m, and the number of mirrors is eight. On this occassion, a pressure required for the blower 11 is 300 Pa and an air flow rate is about 1 m$^3$/s. This requirement can be achieved by usual turbo blowers of centrifugal type with no difficulty.

(2) To obtain the above output, the prior gas laser of low speed flow type requires such specifications that a total length of the discharge tube is 20 m, the number of discharge tubes is 6 to 13, and the number of mirrors is 9 to 14. Thus, the prior generator results in more complexity of the construction and larger size.

In the above described embodiment, since the pair of mirror groups are arranged in such a manner that an optical path between one mirror group including the output mirror 21A and the other mirror group including the plane mirror 21B obliquely intersects the central axis of the discharge space, there exists carbon dioxide gas in the excited state even in a part 5A of the discharge space remoted from the optical axis, for example. This part is out of the axis of the laser beam, so that excitation energy is emitted therefrom through the spontaneous emission. As a consequence, the conversion efficiency from excitation energy into laser beam is lowered in that part. However, in this invention, the gas mixture 6 introduced from the inlet 9A of the cooling passage is turned by the fins 25, passes through the gas introducing ports 12B and then, runs within the discharge space while turning spirally, so that carbon dioxide gas locating in the part 5A of the discharge space is forcedly fed toward the optical axis. Accordingly, there exists a larger amount of carbon dioxide gas in the excited state around the optical axis and thus enhanced gas contributes to promote the laser oscillation, thus permitting to produce the high efficient laser oscillation.

Moreover, since the cooling passage 4A is formed at the center of the discharge tube 2 to cool the entirety of the laser beam 16 for the purpose of improving the efficiency of the laser beam, it is possible to reduce a thermal loss of the laser beam and obtain the improved efficiency of the laser beam.

As fully described in the above, according to the gas laser of this invention, the plural mirror groups are disposed at both ends of the discharge space within the discharge tube in such a manner that an axis of the laser beam between the mirror groups obliquely intersects the central axis of the discharge space, and the cooling passage in communication with the discharge space is attached to the discharge tube, so that the discharge tube can be reduced in its size and a pressure loss of the gas mixture occurred when passing through the discharge tube can be lowered.

We claim:

1. In a gas laser comprising; a discharge tube filled with a gas mixture and having mirrors at both ends thereof; electrodes disposed within said discharge tube for exciting the gas mixture; a cooling passage for introducing the gas mixture into said discharge tube through its one end and for exhausting the same from the other end of said discharge tube; and a heat exchanger for cooling the gas mixture and a blower for forcedly circulating it, both of which are disposed in said cooling passage, an improved gas laser characterized in that said discharge tube has a double-tube construction comprising concentrically disposed inner and outer tubes, a tubular discharge space is formed between said inner and outer tubes, said cooling passage is connected to said discharge space a pair of mirror groups are disposed at both ends of said discharge space, each group comprising a plurality of mirrors arranged in a circumferential direction, and said pair of mirror groups are arranged in such a manner that a laser beam is reflected by said mirror pairs to repeatedly longitudinally traverse in said discharge space and each path of the laser beam between the corresponding mirror pairs in both said mirror groups obliquely intersects the central axis of said discharge space.

2. A gas laser according to claim 1, wherein fins are provided within said discharge space at a position between an inlet of the cooling passage and a cathode, said fins causing said gas mixture to be turned spirally along the path of the laser beam.

3. A gas laser according to claim 1, wherein said fins are located at a position adjacent to the cathode.

4. A gas laser according to claims 1, 2 or 3, wherein a cooling passage is formed inside of said inner tube.

5. A gas laser according to claim 4, wherein said cathode is a ring shaped member which has a passage corresponding to said inner tube and a plurality of gas mixture introducing ports disposed in the circumferential direction.

6. A gas laser according to claim 5, wherein $CO_2$, $N_2$ or He is used as the gas mixture.

7. A gas laser according to claim 4, wherein $CO_2$, $N_2$ or He is used as the gas mixture.

8. A gas laser according to any one of claims 1 thru 3, wherein said cathode is a ring shaped member which has a passage corresponding to said inner tube and a plurality of gas mixture introducing ports disposed in the circumferential direction.

9. A gas laser according to claim 8, wherein $CO_2$, $N_2$ or He is used as the gas mixture.

10. A gas laser according to any one of claims 1 thru 3, wherein $CO_2$, $N_2$ or He is used as the gas mixture.

* * * * *